(12) United States Patent
Andrews et al.

(10) Patent No.: US 9,411,764 B2
(45) Date of Patent: Aug. 9, 2016

(54) OPTIMIZED REDUNDANT HIGH AVAILABILITY SAS TOPOLOGY

(71) Applicant: Lenovo Enterprise Solutions (Singapore) Pte. Ltd., Singapore (SG)

(72) Inventors: Shawn C. Andrews, Youngsville, NC (US); Joseph W. Dain, Vail, AZ (US); Mudi M. Fluman, Haifa (IL); George G. Zamora, Vail, AZ (US)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 371 days.

(21) Appl. No.: 13/948,304

(22) Filed: Jul. 23, 2013

(65) Prior Publication Data

US 2015/0032928 A1 Jan. 29, 2015

(51) Int. Cl.
*G06F 13/40* (2006.01)
*G06F 13/42* (2006.01)

(52) U.S. Cl.
CPC ........ *G06F 13/4022* (2013.01); *G06F 13/4265* (2013.01)

(58) Field of Classification Search
CPC .......................... G06F 13/4022; G06F 13/4265
USPC .......................................................... 710/300
See application file for complete search history.

(56) References Cited

U.S. PATENT DOCUMENTS

| | | | |
|---|---|---|---|
| 8,077,605 B2* | 12/2011 | McCarty | G06F 13/4022 370/217 |
| 2005/0138221 A1* | 6/2005 | Marushak | H04L 45/02 710/1 |
| 2006/0136666 A1 | 6/2006 | Pang et al. | |
| 2007/0255900 A1 | 11/2007 | Lee et al. | |
| 2008/0126851 A1 | 5/2008 | Zadigian et al. | |
| 2008/0162987 A1 | 7/2008 | El-Batal | |
| 2010/0241779 A1* | 9/2010 | Johnson | G06F 13/4022 710/300 |
| 2012/0327582 A1* | 12/2012 | Goodwin | G06F 1/187 361/679.31 |
| 2014/0289437 A1* | 9/2014 | Myrah | G06F 13/32 710/261 |
| 2014/0297910 A1* | 10/2014 | Black | G06F 13/4265 710/104 |

FOREIGN PATENT DOCUMENTS

| | | |
|---|---|---|
| CN | 102508793 A | 6/2012 |
| JP | 2010061664 A | 3/2010 |
| JP | 2012141943 A | 7/2012 |
| WO | 2007081437 A | 7/2007 |

OTHER PUBLICATIONS

Liao, Heng et al; "Managing Access Control Through SAS Zoning."; (2005).

* cited by examiner

*Primary Examiner* — Titus Wong
(74) *Attorney, Agent, or Firm* — Katherine S. Brown; Andrew M. Calderon; Roberts Mlotkowski Safran, Cole & Calderon, P.C.

(57) ABSTRACT

For optimizing redundant high availability serial attached SCSI storage (SAS) topology by providing multiple paths to a same SAS target through a single SAS port on a base unit in a computing environment, the SAS port of a raid controller is attached to one of a multiplicity of just a bunch of disks (JBOD) expansion units having SAS expanders using an SAS cable for providing limited hardware footprint. Load balancing is provided between the base unit and each of the SAS expanders by converting the single SAS port into both dual and redundant paths using the SAS cable.

20 Claims, 8 Drawing Sheets

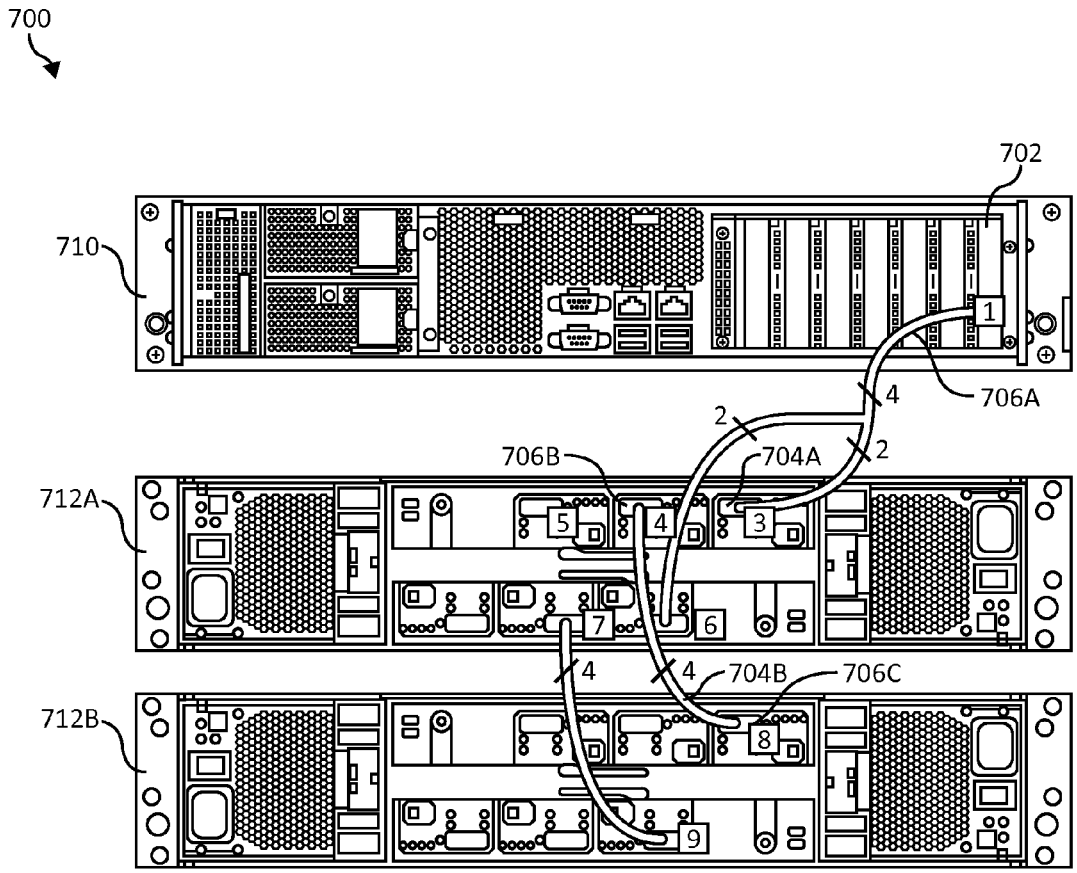

FIGURE 6: SINGLE X4 LANE TO DUAL X2 LANE REDUNDANT SAS CONNECTIVITY

| FROM | TO |
|---|---|
| 1 EXTERNAL RAID CONTROLLER LOWER PORT | 3 RIGHT PORT UPPER CANISTER UPPER EXP |
| 2 EXTERNAL RAID CONTROLLER LOWER PORT | 6 RIGHT PORT LOWER CANISTER UPPER EXP |
| 4 MIDDLE PORT UPPER CANISTER UPPER EXP | 8 RIGHT PORT UPPER CANISTER LOWER EXP |
| 7 MIDDLE PORT LOWER CANISTER UPPER EXP | 9 RIGHT PORT LOWER CANISTER LOWER EXP |

FIG.7

OPTIMIZED REDUNDANT HIGH AVAILABILITY SAS TOPOLOGY

BACKGROUND OF THE INVENTION

1. Field of the Invention

The present invention relates in general to computers, and more particularly to optimizing redundant high availability serial attached SCSI storage (SAS) topology by providing multiple paths to a same SAS target through a single SAS port on a base unit in a computing environment.

2. Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of available data are copied, again and again, by locating repeated data and storing only its first occurrence. Subsequent copies are replaced with pointers to the stored occurrence, which significantly reduces the storage requirements if the data is indeed repetitive. However, a significant need exists for minimizing the hardware footprint in a computing network during deduplication, for example, along with providing enterprise class high availability and load balancing for systems with redundancy.

SUMMARY OF THE DESCRIBED EMBODIMENTS

In one embodiment, a method is provided for optimizing redundant high availability serial attached SCSI storage (SAS) topology by providing multiple paths to a same SAS target through a single SAS port on a base unit in a computing environment. In one embodiment, by way of example only, a single SAS port of a redundant array of independent disks (RAID) controller is attached to one of a multiplicity of just a bunch of disks (JBOD) expansion units having SAS expanders using an SAS cable for providing limited hardware footprint. Load balancing is provided between the base unit and each of the SAS expanders by converting the single SAS port into both dual and redundant paths using the SAS cable.

In another embodiment, a computer system is provided for optimizing redundant high availability serial attached SCSI storage (SAS) topology by providing multiple paths to a same SAS target through a single SAS port on a base unit, in a computing environment. The computer system includes a computer-readable medium and a processor in operable communication with the computer-readable medium. In one embodiment, by way of example only, a single SAS port of a redundant array of independent disks (RAID) controller is attached to one of a multiplicity of just a bunch of disks (JBOD) expansion units having SAS expanders using an SAS cable for providing limited hardware footprint. Load balancing is provided between the base unit and each of the SAS expanders by converting the single SAS port into both dual and redundant paths using the SAS cable.

In a further embodiment, a computer program product is provided for optimizing redundant high availability serial attached SCSI storage (SAS) topology by providing multiple paths to a same SAS target through a single SAS port on a base unit, in a computing environment. The computer-readable storage medium has computer-readable program code portions stored thereon. The computer-readable program code portions include a first executable portion that attaches a single SAS port of a redundant array of independent disks (RAID) controller to one of a multiplicity of just a bunch of disks (JBOD) expansion units having SAS expanders using an SAS cable for providing limited hardware footprint. Load balancing is provided between the base unit and each of the SAS expanders by converting the single SAS port into both dual and redundant paths using the SAS cable.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 7 is a block diagram illustrating an alternative hardware structure of a serial attached SCSI storage (SAS) system with single x4 lane to dual x2 lane redundant SAS connectivity in a computer system in which aspects of the present invention may be realized;

DETAILED DESCRIPTION OF THE DRAWINGS

Figure 1:
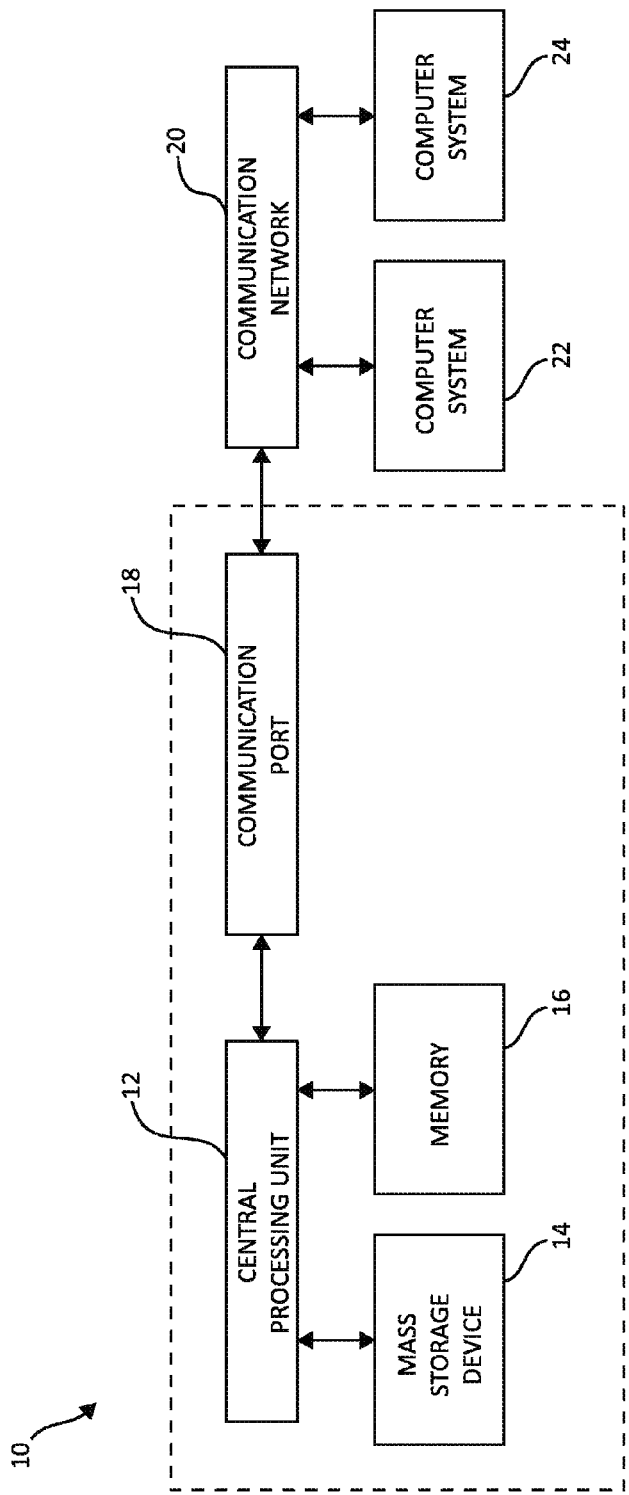
FIG. 1 is a block diagram illustrating a computing system environment having an example storage device in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. However, as mentioned above, a significant need exists for minimizing the hardware footprint in a computing network during deduplication, for example, along with providing enterprise class high availability and load balancing for systems with redundancy. Thus, as described herein, the present invention provides a solution providing enterprise class high availability, hot swap capability, and load balancing between a base storage controller, for example, that contains drives and one or more expansion just a bunch of disks (JBODs) that contain drives in a manner that minimizes the hardware footprint. In one embodiment, the JBOD, as used herein, may also be referred to as SAS expanded bunch of disks and/or SAS expander based bunch of disks (EBOD). In one embodiment, a SAS EBOD provides a SAS interface between the internal hard disk drives (HDDs) and external SAS ports.

In one embodiment, as described herein, a Serial-attached SCSI (SAS) architecture/topology defines a serial device interconnect and transport protocol that defines the rules for information exchange between devices. In one embodiment, the SAS is an evolution of a parallel SCSI device interface into a serial point-to-point interface. SAS physical links (PHYs or phys) are a set of four wires used as two differential signal pairs. One differential signal transmits in one direction, while the other differential signal transmits in the opposite direction. Data may be transmitted in both directions simultaneously. In one embodiment, the PHYs are contained in SAS ports, which contain one or more phys. A port is a wide port if there are more than one PHY in the port. If there is only one phy in the port, it is a narrow port. In one embodiment, a port is identified by a unique SAS worldwide name (also called SAS address).

In one embodiment, a SAS controller contains one or more SAS ports. A path is a logical point-to-point link between a SAS initiator port in the controller and a SAS target port in the I/O device (for example a disk). A connection is a temporary association between a controller and an I/O device through a path. A connection enables communication to a device. The controller can communicate to the I/O device over this connection by using either the SCSI command set or the ATA/ATAPI command set depending on the device type.

A SAS expander enables connections between a controller port and multiple I/O device ports by routing connections between the expander ports. Using expanders creates more nodes in the path from the controller to the I/O device. If an I/O device supports multiple ports, more than one path to the device can exist when there are expander devices included in the path. In one embodiment, a SAS fabric refers to the summation of all paths between all SAS controller ports and all I/O device ports in the SAS subsystem including cables, enclosures, and expanders.

In one embodiment, the present invention provides a solution for optimizing redundant high availability serial attached SCSI storage (SAS) topology by providing multiple paths to a same SAS target through a single SAS port on a base unit in a computing environment. In one embodiment, by way of example only, a single SAS port of a redundant array of independent disks (RAID) controller is attached to one of a multiplicity of just a bunch of disks (JBOD) expansion units having SAS expanders using a SAS cable for providing limited hardware footprint. Load balancing is provided between the base unit and each of the SAS expanders by converting the single SAS port into both dual and redundant paths using the SAS cable. For example, in one embodiment, for optimizing redundant high availability serial attached SCSI storage (SAS) topology by providing multiple paths to a same SAS target through a single SAS port on a base unit, the present invention may be implemented in IBM® ProtecTIER® deduplication system TS7620™ with attachment to up to 2 expansion units, but may support N number of expansion units from an architectural point of view.

In one embodiment, the present invention provides the ability to attach a single SAS port of a storage controller to multiple JBOD expansion units where the JBOD expansion units have redundant SAS expander canisters using a customized SAS cable in order to provide a small hardware footprint that: 1) Allows application level firmware/software to provide load balancing between the base unit (e.g., TS7620 base unit) and the redundant expansion canisters in the same JBOD while using one external SAS port on the base redundant array of independent disks (RAID) controller (e.g., base TS7620 RAID controller), 2) allows application level firmware/software to provide high availability between the base unit (e.g., TS7620 base unit) and redundant expansion canisters in the same JBOD while using one external SAS port on the base redundant array of independent disks (RAID) controller (e.g., the base TS7620 RAID controller), 3) the base unit (e.g., TS7620 base unit) to attach to internal drives as well as external drives in a manner that allows a single redundant array of independent disks (RAID) controller to manage the drives in the base and expansion units such that hot spares are global between the enclosures, 4) allows individual SAS expander canisters to be hot swappable as the custom cable is designed to be flexible enough to allow movement of the cable in order to facilitate how swap removal of an expander canister without risk of damaging the cable, 5) allows additional expansion units to be daisy chained to the first expansion unit in a redundant configuration that allows for load balancing, high availability and hot swap capability, 6) allows connectivity to internal and external storage with redundancy to external storage while minimizing hardware footprint and providing the ability to manage hot spares globally. Moreover, since the present invention is installed in a customer provided rack, a customizable cable is designed to accommodate different customer environments. In one embodiment, the present invention provides sufficient bandwidth to satisfy application level throughput requirements, and allows for a simplified, non-disruptive adding of expansion units.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
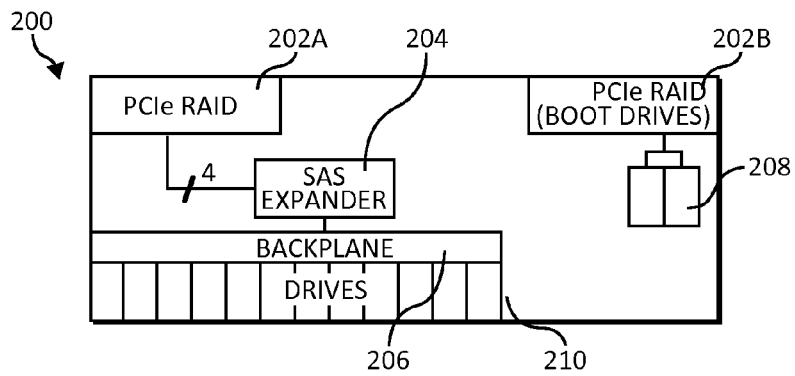
FIG. 2 is a block diagram illustrating a hardware structure of a serial attached SCSI storage (SAS) system in a computer system in which aspects of the present invention may be realized.

As mentioned above, the present invention optimizes redundant high availability serial attached SCSI storage (SAS) topology by providing multiple paths to a same SAS target through a single SAS port on a base unit in a computing environment. In one embodiment, by way of example only, a single SAS port of a redundant array of independent disks (RAID) controller is attached to one of a multiplicity of just a bunch of disks (JBOD) expansion units having SAS expanders using an SAS cable for providing limited hardware footprint. Load balancing is provided between the base unit and each of the SAS expanders by converting the single SAS port into both dual and redundant paths using the SAS cable. For example, in one embodiment, for optimizing redundant high availability serial attached SCSI storage (SAS) topology by providing multiple paths to a same SAS target through a single SAS port on a base unit, the present invention may be implemented in IBM® ProtecTIER® deduplication system TS7620™ with attachment to up to 2 expansion units, but may support N number of expansion units from an architectural point of view. Turning now to FIG. 2, a block diagram illustrating a hardware structure of a serial attached SCSI storage (SAS) system 200 in a computer system in which aspects of the present invention may be realized. In one embodiment, the base unit (e.g., TS7620 base unit) is a 2U (two rack unit of height) 12 drive 210 appliance that runs the deduplication application code (e.g., the ProtecTIER deduplication application code) to provide data deduplication and replication capabilities for backup and restore environments. The base unit 200 (e.g., TS7620 base unit) has a single peripheral component interconnect exchange (PCIe) RAID controller adapter 202a that attaches via a single x4 lane internal mini SAS connector (e.g., a single x4 lane SFF 8087 internal mini SAS connector) to an internal SAS expander 204 that attaches to the 12 drives 210 in the front of the base unit 200 using backplane 206 for connection. The base controller 200 also includes a PCIe Raid boot drives 208 and an associated boot drive backplane. It should be noted that a lane is composed of two differential signaling pairs: one pair for receiving data, the other for transmitting. Thus, each lane may be composed of four wires and/or signal traces. Conceptually, each lane may be used as a full-duplex byte stream, transporting data packets in eight-bit 'byte' format, between endpoints of a link, in both directions simultaneously. Physical PCIe slots may contain from one to thirty-two lanes, in powers of two (1, 2, 4, 8, 16 and 32). For example, as described herein, the lane counts are written with an "x" prefix (e.g., x16 represents a sixteen-lane card or slot), with x16 being the largest size in common use.

Figure 3:
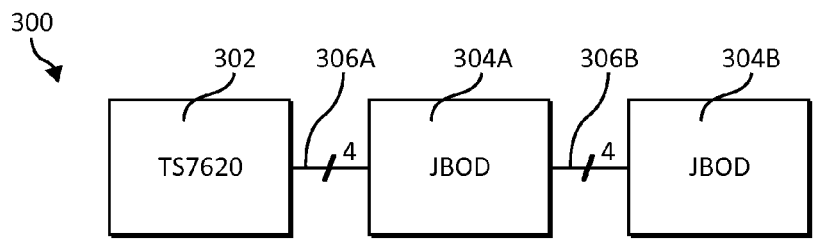
FIG. 3 is a block diagram illustrating a hardware structure of a serial attached SCSI storage (SAS) system with a base unit and 2 just a bunch of disk (JBOD) expansions in a computer system in which aspects of the present invention may be realized.

FIG. 3 is a block diagram illustrating a hardware structure of a serial attached SCSI storage (SAS) system 300 with a base unit and 2 just a bunch of disk (JBOD) expansions 304 (304a and 304b) in a computer system in which aspects of the present invention may be realized. FIG. 3 provides a logical view of the external SAS topology. The base unit 302 (e.g., TS7620 base unit) can also attach to up to two JBOD expansion units 304a and 304b via a first 4 lane SAS cable 306a from the base unit 302 (e.g., TS7620 base unit) to first JBOD 304a and via a 2nd 4 lane SAS cable from the first JBOD 304a to the 2nd JBOD 304b using 4 lane SAS connectors (e.g., a 4 lane SFF8088 miniSAS connectors) on the ends of the SAS cables 306 (e.g., 306a and 306b). The TS7620 base unit 302 contains 12 drives and each JBOD 304 contains 12 additional drives.

Figure 4:
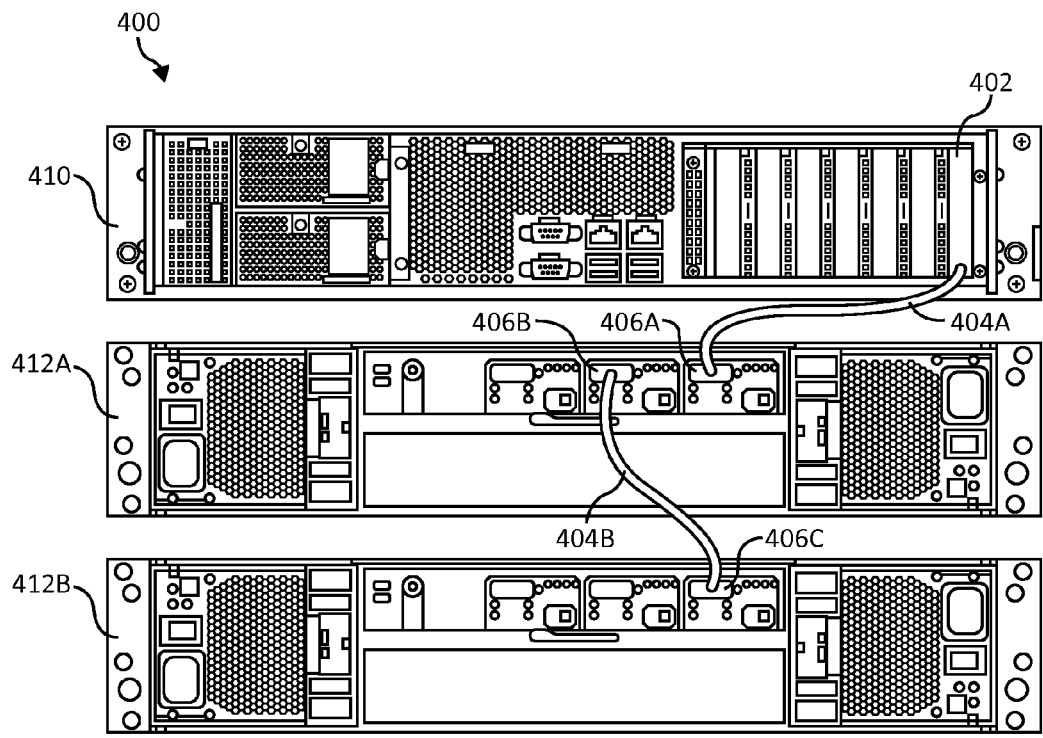
FIG. 4 is a block diagram illustrating a hardware structure of a serial attached SCSI storage (SAS) system chain producing a RAID array in a computer system in which aspects of the present invention may be realized.

FIG. 4 is a block diagram illustrating a hardware structure of a serial attached SCSI storage (SAS) system chain producing a RAID array in a computer system in which aspects of the present invention may be realized. FIG. 4 illustrates the physical view of the external SAS topology. On base unit 410 (e.g., TS7620 base unit) the RAID adapter 402 provides a single 4×6 Gb/s external SAS port (24 Gb/s total bandwidth) that provides the connectivity between the base unit 410 (e.g., TS7620 base unit) and the first expansion 412a.

It is observed in FIG. 3 and FIG. 4 that the SAS chain producing the RAID array is consisted from the following HW building blocks; 1) a PCIe RAID adapter—single instance in the configuration, 2) Cable 1 404a—connects the TS7620 base unit 410 to the first expansion JBOD 412, 3) SAS expander canister—one exist per each JBOD expansion unit 412a, while two is allowed when it is fully configured, 3) Cable 2 404b—connects first expansion unit 412a to the second expansion unit 412b, and 4) SAS expander canister—again a single canister exist for the $2^{nd}$ expansion 412b as can be seen in FIG. 4. The external SAS cables 404, and single SAS expander modules in the expansion units 412 are all single points of failure that does not provide enterprise quality hardware availability.

Adding two SAS expanders per expansion JBOD drawer and doubling the number of SAS cables provide redundancy, load balancing and hot swap capabilities. However, the problem in providing double the cables and SAS expander canisters lies in the configuration of the base unit 410 (e.g., TS7620 base unit). Also, there is no Enterprise class SAS HBA or RAID adapter available in the marketplace that provides an x4 lane internal SAS port and two x4 lane external SAS ports. In one embodiment, one solution employs a storage bridge bay architecture where the hardware architecture of the base unit comprises redundant controller modules that would run the ProtecTIER application code and provide redundant SAS connectivity to expansion JBODs. This hardware configuration requires customized SBB storage controllers adapted to the ProtecTIER software requirements.

Figure 5:
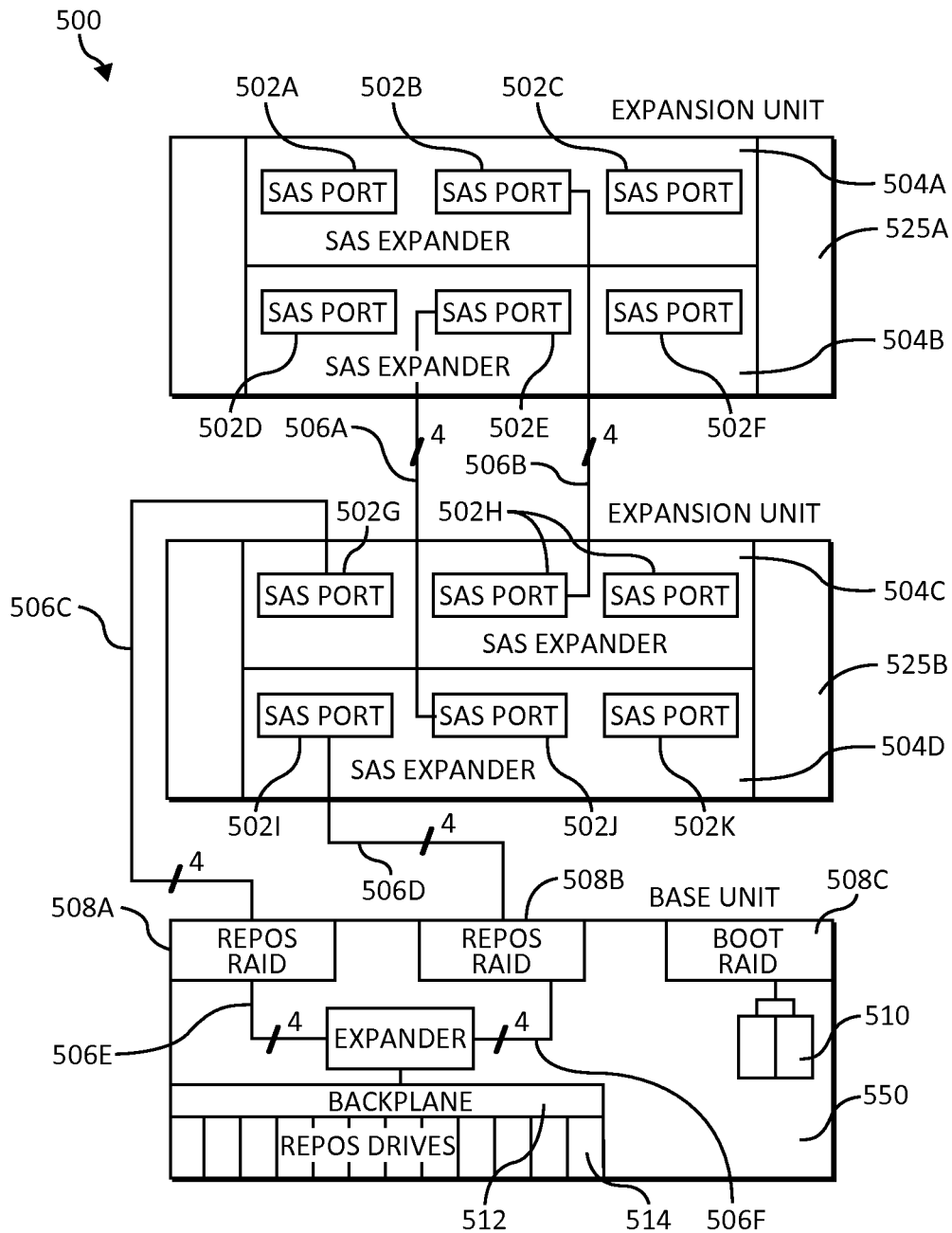
FIG. 5 is a block diagram illustrating a hardware structure of a serial attached SCSI storage (SAS) system with redundant SAS connectivity in a computer system in which aspects of the present invention may be realized.

In an alternative embodiment, two SAS RAID adapters are used in a high availability configuration within the base unit (e.g., TS7620 base unit) where each RAID adapter has a single x4 internal SAS connector and a single x4 external SAS connector. FIG. 5 illustrates this additional embodiment. FIG. 5 is a block diagram illustrating a hardware structure of a serial attached SCSI storage (SAS) system 500 with redundant SAS connectivity in a computer system in which aspects of the present invention may be realized. As illustrated, two SAS RAID expansion units 525A-B are used in a high availability configuration within the base unit 550 (e.g., TS7620 base unit) where each RAID adapter 508A and 508B have a single x4 internal SAS connector 506E, 506F and a single x4 external SAS connector 506C, 506D. While this solution provides full redundancy it requires 4 PCIe slots 508 since each RAID adapter 525 requires a battery backup unit that must be installed in separate PCIe slots in order to provide RAID write caching capability. The base unit 550 includes a backplane 512 and may include drives (e.g., 12 drives) 514 located on the base unit along with a boot RAID adapter 508c with boot drives 510 on the base unit 550. Also, each expansion unit 525a and 525b contain SAS expanders 504 (e.g., 504A-D) that each has at least one SAS port 502 (502A-K). The base unit 550 (e.g., TS7620 base unit) does not have enough PCIe slots 508 to contain this architecture and still provide the additional adapters 502 required for host connectivity, management, replication, etc. In addition, enablement of this hardware architecture requires enabling write cache mirroring between the adapters, which can be complex.

Figure 6:
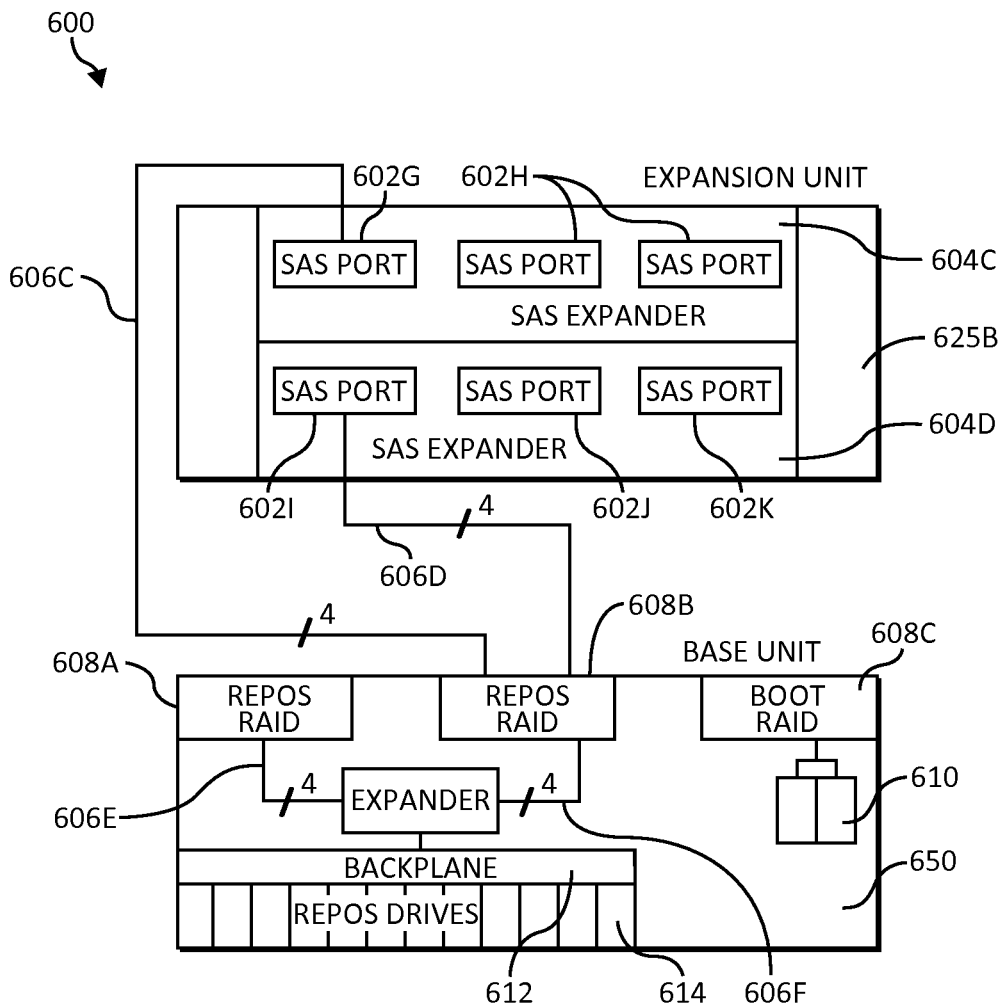
FIG. 6 is a block diagram illustrating an alternative hardware structure of a serial attached SCSI storage (SAS) system with redundant SAS connectivity with 2 RAID adaptors in a computer system in which aspects of the present invention may be realized.

FIG. 6 is a block diagram illustrating an alternative hardware structure of a serial attached SCSI storage (SAS) system 600 with redundant SAS connectivity with 2 RAID adapters in a computer system in which aspects of the present invention may be realized. Another solution is to use two RAID adapters 608a and 608b without enabling write cache mirroring between the adapters 608. As illustrated, two SAS RAID adapters 608 are used in a high availability configuration within the base unit 650 (e.g., TS7620 base unit) with a RAID adapter 608 having a single x4 internal SAS connector 606e. The base unit 650 includes a backplane 612 and may include drives (e.g., 12 drives) 614 located on the based unit 650 along with a boot RAID adapter 608c with boot drives 610 on the base unit 650. Also, the expansion unit 625b contains SAS expanders 604 (e.g., 604c-d) that have at least one SAS port 602 (602g-k). For example, a RAID adapter 608a with a x4 lane internal mini SAS connector 606e can be used to connect to the drives 614 internal to the base unit 650 (e.g., TS7620 base unit) while a second adapter 608 that contains two x4 lane external SAS ports 602 can be used to provide redundant connectivity to expansion JBODs 625b containing redundant expander canisters 604. However, a challenge with this alternative embodiment is that hot spares are not global between the RAID adapters 608. In other words if a drive fails in the base unit 650 (e.g., TS7620 base unit), a hot spare from the expansion JBOD cannot be deployed since a separate RAID controller is managing the drives in the expansion unit and vice versa. Also there are not enough PCIe slots 608 to contain all the adapters 625 necessary to run the application code because each RAID controller needs an extra slot for battery backup units.

FIG. 7 is a block diagram illustrating a hardware structure of a serial attached SCSI storage (SAS) system 700 with single x4 lane to dual x2 lane redundant SAS connectivity in a computer system in which aspects of the present invention may be realized. In one embodiment, the solutions does not provide any drives in base unit 710 (e.g., TS7620 base unit) but still use a RAID adapter 70212 (e.g., 712a and 712b) that contains two x4 lane external SAS ports 706 (e.g., 706a-c) to provide redundant connectivity to JBODs however the storage density drops in this solution to a point that is not competitive.

In one embodiment, as illustrated, external SAS port 1 on the RAID adapter 702 is connected to 3 right port 704A on the upper canister of the upper expansion unit and is also connected to 6 right port. There are 2 external RAID controller lower ports (e.g., external MegaRaid lower port) and external MegaRaid lower port is connected to 6 right port lower canister upper expansion units. There are 4 middle port upper canister upper expansion units connected to 8 right port upper canister lower expansion unit. There are 7 middle port upper canister upper expansion units connected to 9 right port upper canister lower expansion unit. It should be noted, as described herein, the RAID controllers may be implemented as a hardware device operable by a processor device, and may be implemented without a hardware RAID adapter (e.g., a software RAID controller) where a user runs software RAID, operable by a processor device, in the base unit and uses a normal SAS port to attach to target devices (e.g., expansion units).

Figure 8:
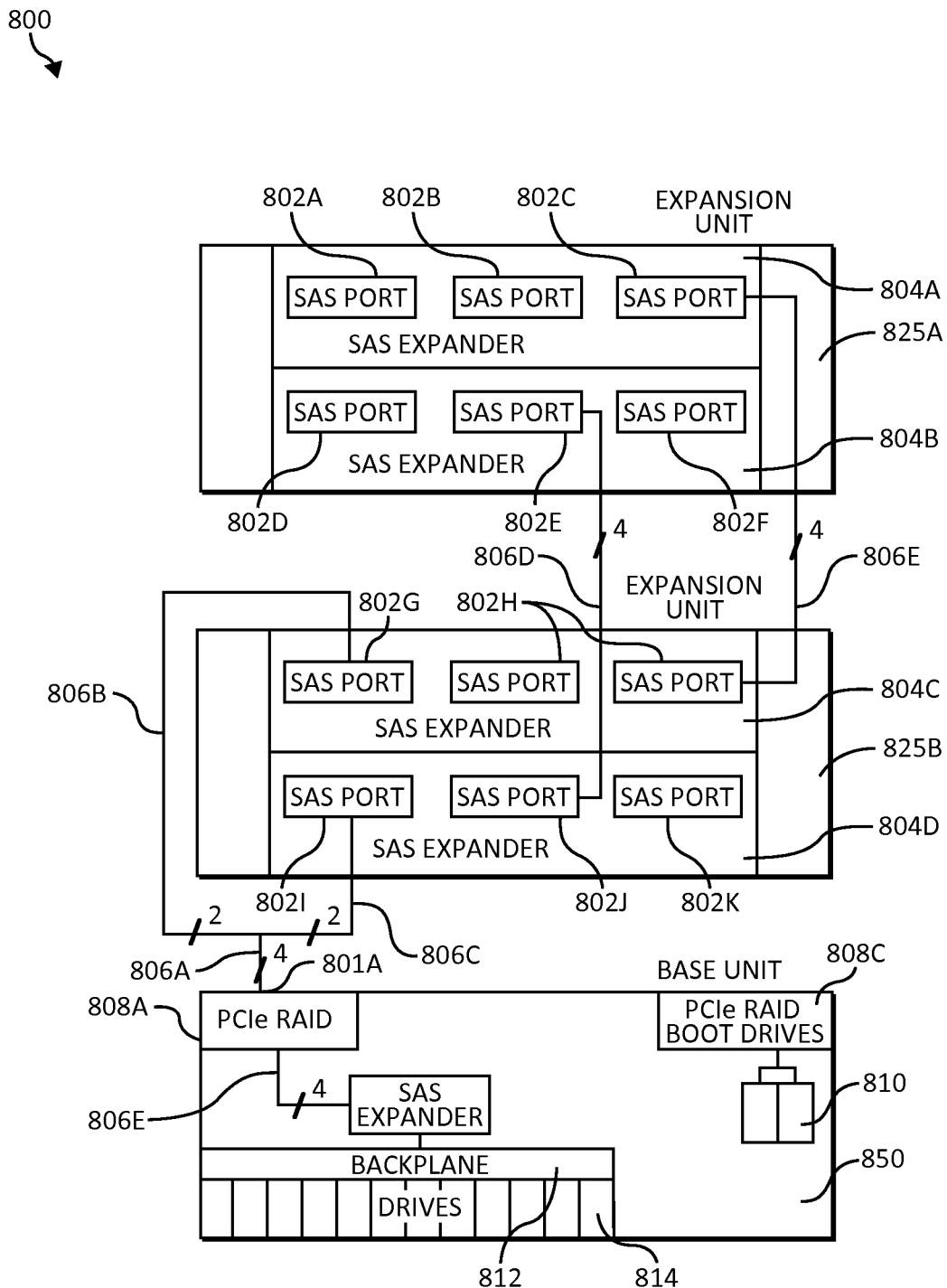
FIG. 8 is a block diagram illustrating an internal and external hardware structure of a serial attached SCSI storage (SAS) system SAS connectivity in a computer system in which aspects of the present invention may be realized.

FIG. 8 is a block diagram illustrating an internal and external hardware structure 800 of a serial attached SCSI storage (SAS) system SAS connectivity in a computer system in which aspects of the present invention may be realized. As described FIG. 8 illustrates the physical view of the external SAS connectivity from the base unit (e.g., TS7620 base unit) to the expansion JBODs with redundant expander canisters. FIG. 8 illustrates a base unit (e.g., TS7620 base unit) 850 and a RAID adapter 808A. The base unit 850 includes a backplane 812 and may include drives (e.g., 12 drives) 814 located on the based unit 850 along with a boot RAID adaptor 808C with boot drives 810 on the base unit 850. Also, the expansion units 825A, 825B contains SAS expanders 804 (e.g., 804a-d) that each may have at least one SAS port 802 (e.g., 802a-k). It should be noted that the expansion units 825 may also be referred to as JBOD drawers.

As described herein, the advantages of the present invention are realized by providing a hardware architecture that allows multiple paths to the same SAS target through a single SAS port 801A on a PCIe RAID adapter (e.g. 808A) on a base unit 850 (e.g., TS7620 base unit). In other words, the SAS drives in the JBODs each have redundant SAS ports 802 that will be assigned with two different SAS addresses through redundant SAS expanders 804 of each JBOD. The x4 lane wide SAS port on PCIe RAID adapter 808A on the base 850 TS7620 contains four SAS physical links 806A (PHYs or phys), which are combined into a single wide port. The first two phys 806B and the second two phys 806C are split to connect to a first expander canister 804c and 804d in the first JBOD drawer 825A, and a x4 lane SAS cables 806D and 806E connect to the second expander canister 804A and 804B in the second JBOD drawer 825B The two phys 806b and 806c going to the first expander canister 804c and 804d are turned into a x2 lane wide SAS connection to provide 2×6 Gb/s bandwidth (12 Gb/s). The 12 Gb/s bandwidth provides sufficient performance for many types of applications/appliances. Specifically, in one embodiment the base unit 850 (e.g., TS7620 base unit) provides approximately 350 MB/s backup throughput and 400 MB/s restore throughput in practical real world/customer environments. The two x2 lane SAS connections 802A, 802B are also used as multiple paths to the same set of SAS drives where if one of the paths fails, the redundant path may maintain connectivity.

Figure 9:
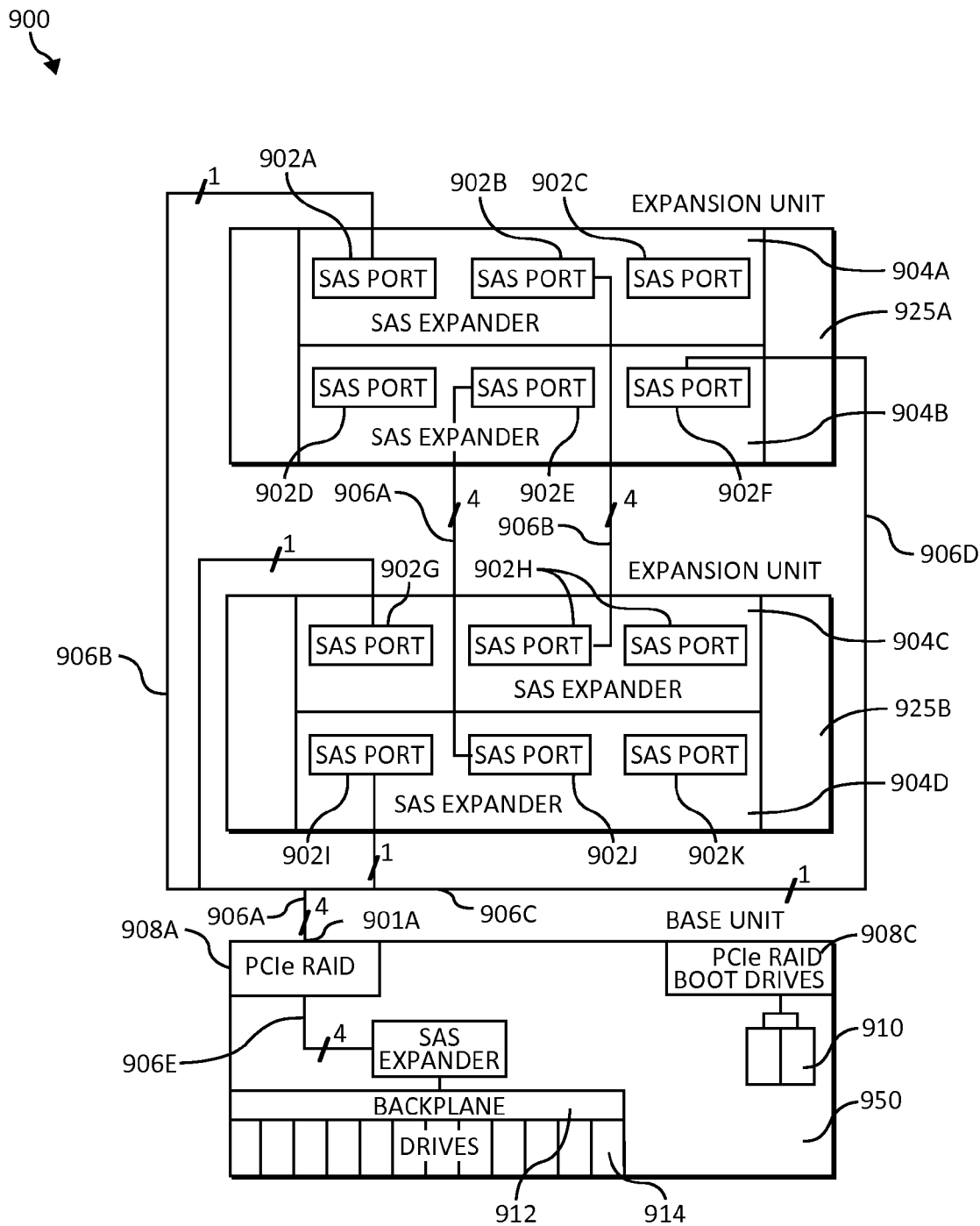
FIG. 9 is a block diagram illustrating an alternative internal and external hardware structure of a serial attached SCSI storage (SAS) system SAS connectivity in a computer system in which aspects of the present invention may be realized.

FIG. 9 is a block diagram illustrating an alternative internal and external hardware structure 900 of a serial attached SCSI storage (SAS) system SAS connectivity in a computer system in which aspects of the present invention may be realized. FIG. 9 illustrates a base unit (e.g., TS7620 base unit) 950 and a RAID adapter 908a. The base unit 950 includes a backplane 912 and may include drives (e.g., 12 drives) 914 located on the based unit 950 along with a boot RAID adapter 908C with boot drives 910 on the base unit 950. A single SAS port 901A is located on a PCIe RAID adapter (e.g. 908A) on a base unit

950. Also, expansion units 925A and 925B contains SAS expanders 904 (e.g., 904A-D) that each may have at least one SAS port 902 (e.g., 902A-K). In an alternate embodiment, redundant connectivity is also provided between a single SAS port 902 on the base unit 950 and multiple JBOD expansion units 925a and 925b with redundant SAS expander canisters 904 and ports 902 where a single x4 cable 906 is split into four x1 lane connections 906 (e.g., 906A-D). Each x1 lane connection 906 plugs into a port 902 on separate redundant SAS expander canisters 904. Such an embodiment provides the same benefits as described above with the following caveats.

In one embodiment, a single SAS expander canister failure in the base expansion JBOD does not cause loss of connectivity in subsequent expander canisters in the same SAS chain. In one embodiment, the architecture provides 6 Gb/s bandwidth instead of 2×6 Gb/s bandwidth. Also, in one embodiment of the base unit (e.g., TS7620 base unit), a single 6 Gb/s link provides adequate bandwidth for the ProtecTIER software application in real world customer environments. However, the illustrated embodiment is limited to a base TS7620 and two expansion units.

Figure 10:
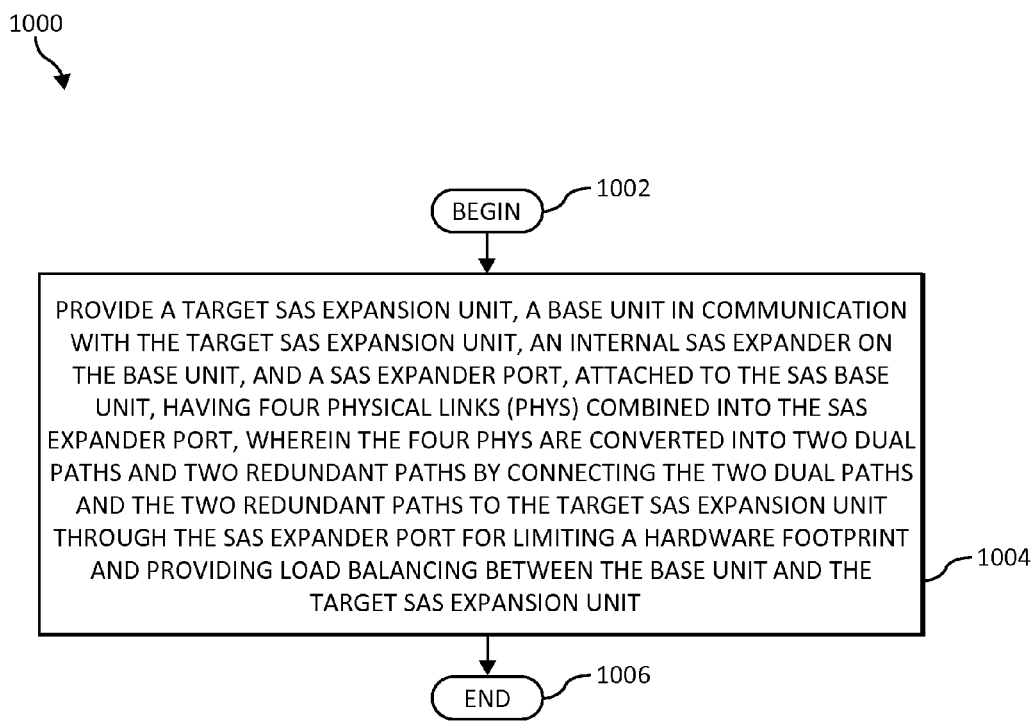
FIG. 10 is a flowchart illustrating an exemplary method for a serial attached SCSI storage (SAS) system SAS connectivity in which aspects of the present invention may be realized.

FIG. 10 is a flowchart illustrating an exemplary method of manufacturing for a serial attached SCSI storage (SAS) system SAS connectivity in which aspects of the present invention may be realized. The method of manufacturing 1000 begins (step 1002), for optimizing redundant high availability serial attached SCSI storage (SAS) topology by providing at least one target SAS expansion unit (that may be daisy chained), a base unit in communication with the target SAS expansion unit, an internal SAS expander on the base unit, and a SAS expander port, attached to the SAS base unit, having four physical links (PHYs) combined into the SAS expander port, wherein the four PHYs are converted into multiple paths and multiple redundant paths by connecting the multiple paths and the multiple redundant paths to the target SAS expansion unit through the SAS expander port for limiting a hardware footprint and providing load balancing between the base unit and the target SAS expansion unit (step 1004). The method of manufacturing ends (step 1006).

In one embodiment, the present invention provides a solution for optimizing redundant high availability serial attached SCSI storage (SAS) topology by providing multiple paths to a same SAS target through a single SAS port on a base unit in a computing environment. In one embodiment, by way of example only, a single SAS port of a raid controller is attached to one of a multiplicity of just a bunch of disks (JBOD) expansion units having SAS expanders using an SAS cable for providing limited hardware footprint. Load balancing is provided between the base unit and each of the SAS expanders by converting the single SAS port into both dual and redundant paths using the SAS cable.

In one embodiment, the present invention allows for multiple paths to the same SAS target through the single SAS port on the base unit, wherein the SAS cable is customized. In one embodiment, the present invention generates high availability using application level firmware between the base unit and the SAS expanders in the same one of the plurality of JBOD expansion units while using one external SAS port on a base RAID controller. The SAS drives are assigned in the JBOD expansion units with two different SAS addresses via redundant SAS expanders of each JBOD.

In one embodiment, the present invention attaches the base unit to both internal drives of the base unit and external drives of the SAS expanders in a manner that allows a single controller to manage SAS drives in the base unit and SAS expanders such that hot spares are global between the enclosures, wherein the hot spares are standby drives. In one embodiment, the present invention splits a 4 lane SAS connection of the SAS port into two dual lane SAS connections for connecting the SAS expanders of the JBOD expansion units. In one embodiment, the present invention uses the two dual lane SAS connections as the multiple paths to a same set of SAS drives (or same set of serial ATA (SATA) drives, and/or solid state drives (SSD) drives) where if one of the multiple paths fails a redundant path of the multiple paths maintains connectivity.

In one embodiment, the present invention provides just a bunch of disks (JBOD) expansion units, a serial attached SCSI storage (SAS) expanders included in the JBOD expansion units, a SAS expanders in the JBOD expansion units, a single SAS port that is attached to the JBOD expansion units having the SAS expanders, a SAS cable for connecting the SAS expanders to the SAS port, and a base unit having the single SAS port for optimizing redundant high availability SAS topology by providing multiple paths to a similar SAS target through the single SAS port on the base unit. The SAS single port is converted into both dual and redundant paths using a customizable SAS connection (e.g., a customizable cable) for providing the multiple paths to the similar target SAS expander through the single SAS port on the base for limiting a hardware footprint and providing load balancing between the base unit and each of the SAS expanders.

In one embodiment, the present invention provides a controller (e.g., a raid controller), which may be hardware and/or software operable by at least one processor device, on the base unit, wherein the base unit using the single SAS port generates high availability of a SAS architecture using application level firmware between the base unit and each of the SAS expanders in the same one of the plurality of JBOD expansion units while using the SAS port that is external on the RAID controller.

In one embodiment, the present invention provides SAS drives, serial ATA (SATA) drives, and/or solid state drives (SSD) drives in the JBOD expansion units. The SAS drives, the serial ATA (SATA) drives, and/or the solid state drives (SSD) drives in the JBOD expansion units are assigned with two different SAS addresses via the SAS expanders that are redundant of the plurality of JBOD expansion units.

In one embodiment, the present invention provides an internal SAS drive in the base unit and external SAS drives in at least one of the JBOD expansion units. The internal SAS drive is connected by the base unit to the external SAS drives for allowing the RAID controller to manage the internal SAS drive in the base unit and the external SAS drives such that those external SAS drives designated as hot spares are global between the base unit and the at least one of the JBOD expansion units. The hot spares are standby drives.

In one embodiment, the present invention provides a 4-lane SAS connection of the single SAS port. The 4 lane SAS connection of the SAS port is split into two dual lane SAS connections for connecting at least one of the SAS expanders of the JBOD expansion units. The two dual lane SAS connections are used as the multiple paths to a same set of either the SAS drives, the serial ATA (SATA) drives, and/or the solid state drives (SSD) drives where if one of the paths fails a redundant path of the multiple paths maintains connectivity.

In one embodiment, the present invention provides a system for optimizing redundant high availability of a serial attached SCSI storage (SAS) storage system. In one embodiment, the system provides a target SAS expansion unit, a base unit in communication with the target SAS expansion unit, an internal SAS expander on the base unit; a SAS expander port, attached to the SAS base unit, having four PHY's combined into the SAS expander port, and the four PHYS are converted into two dual paths and two redundant paths by connecting the two dual paths and the two redundant paths to the target SAS expansion unit through the SAS expander port for limiting a hardware footprint and providing load balancing between the base unit and the target SAS expansion unit.

In one embodiment, the present invention provides at least one SAS expander in the target SAS expansion unit.

In one embodiment, the present invention provides application level firmware (operable by a processor device) in the storage (SAS) storage system and a controller (operable by a processor device) on the base unit, wherein the base unit using the SAS expander port generates high availability of the storage (SAS) storage system using the application level firmware between the base unit and the target SAS expansion unit.

In one embodiment, the present invention provides a target SAS port located in the target SAS expansion unit. The target SAS port in the target SAS expansion unit is assigned two different SAS addresses. In one embodiment, the present invention provides a first expander unit on the target SAS expansion unit and a second expander unit on the target SAS expansion unit, wherein the two dual paths are connected to the first expander unit and the two redundant paths are connected to the second expander unit. The two dual paths that are connected to the first expander unit are converted into a two lane wide SAS connection for providing increasing bandwidth (e.g., at least 12 gigabytes (GBs) of bandwidth), and the two redundant paths that are connected to the second expander unit are turned into an alternative two lane wide SAS for providing increasing bandwidth (e.g., at least 12 gigabytes (GBs) of bandwidth).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A system, comprising:
   a plurality of just a bunch of disks (JBOD) expansion units;
   serial attached SCSI storage (SAS) expanders included in the plurality of JBOD expansion units;
   a single SAS port that is attached to the plurality of JBOD expansion units having the SAS expanders;
   a single SAS cable to connect the SAS expanders to the single SAS port; and
   a base unit having the single SAS port, wherein
   the single SAS port is converted into multiple redundant paths by a split of the SAS cable at a location along the SAS cable between the single SAS port of the base unit and the SAS expanders of the plurality of JBOD expansion units to provide a plurality of paths to a similar SAS target in the plurality of JBOD expansion units through the single SAS port on the base unit.

2. The system of claim 1, wherein the SAS cable is customized to limit a hardware footprint and to provide load balancing and highly available redundant connectivity between the base unit and each of the SAS expanders, and the plurality of JBOD expansion units includes an SAS expanded bunch of disks (EBOD).

3. The system of claim 1, further including a raid controller on the base unit and at least one processor device controlling the raid controller, wherein the base unit using the single SAS port generates high availability of a SAS architecture using application level firmware between the base unit and each of the SAS expanders in the same one of the plurality of JBOD expansion units while using the single SAS port that is external on the RAID controller.

4. The system of claim 1, further including at least one of SAS drives, serial ATA (SATA) drives, and solid state drives (SSD) drives in the plurality of JBOD expansion units, wherein the at least one of the SAS drives, the serial ATA (SATA) drives, and the solid state drives (SSD) drives in the plurality of JBOD expansion units are assigned with two different SAS addresses via the SAS expanders that are redundant of the plurality of JBOD expansion units.

5. The system of claim 3, further including an internal SAS drive in the base unit and a plurality of external SAS drives in at least one of the plurality of JBOD expansion units, wherein the internal SAS drive is connected by the base unit to the plurality of external SAS drives for allowing the RAID controller to manage the internal SAS drive in the base unit and the plurality of external SAS drives such that those of the plurality of external SAS drives designated as hot spares are global between the base unit and the at least one of the plurality of JBOD expansion units, wherein the hot spares are standby drives.

6. The system of claim 4, further including a 4 lane SAS connection of the single SAS port, wherein the 4 lane SAS connection of the single SAS port is split into at least one of two dual lane SAS connections and a single lane SAS connection for connecting at least one of the SAS expanders of the plurality of JBOD expansion units.

7. The system of claim 6, wherein the at least one of the two dual lane SAS connections and the single lane SAS connection are used as the plurality of paths to a same set of the at least one of the SAS drives, the serial ATA (SATA) drives, and the solid state drives (SSD) drives where if one of the plurality of paths fails a redundant path of the plurality of paths maintains connectivity.

8. A system for optimizing redundant high availability of a serial attached SCSI storage (SAS) storage system, comprising:
   a target SAS expansion unit;
   a base unit in communication with the target SAS expansion unit:
   an internal SAS expander on the base unit; and
   a SAS expander port, attached to the SAS base unit, having four physical links (PHYs) combined into the SAS expander port, and the four PHYs are converted into multiple redundant paths by a split of a single SAS cable, which connects the SAS expander port to the target SAS expansion unit, at a location along the SAS cable between the SAS expander port and the target SAS expansion unit to provide the multiple redundant paths to the target SAS expansion unit through the SAS expander port.

9. The system of claim 8, further including at least one SAS expander in the target SAS expansion unit, wherein the SAS expander port is a single SAS expander port, and wherein the SAS expander port and the SAS cable are configured to limit a hardware footprint and to provide load balancing between the base unit and the target SAS expansion unit.

10. The system of claim 8, further including application level firmware in the storage (SAS) storage system and a controller on the base unit, wherein the base unit using the SAS expander port generates high availability of the storage (SAS) storage system using the application level firmware between the base unit and the target SAS expansion unit.

11. The system of claim 8, further including a target SAS port located in the target SAS expansion unit, wherein the target SAS port in the target SAS expansion unit is assigned two different SAS addresses.

12. The system of claim 8, further including a first expander unit on the target SAS expansion unit and a second expander unit on the target SAS expansion unit, wherein the two dual paths are connected to the first expander unit and the two redundant paths are connected to the second expander unit.

13. The system of claim 12, wherein the two dual paths that are connected to the first expander unit are converted into a two lane wide SAS connection for providing at least 12 gigabytes (GBs) of bandwidth, and the two redundant paths that are connected to the second expander unit are turned into an alternative two lane wide SAS for providing at least 12 gigabytes (GBs) of bandwidth.

14. The system of claim 10, further including a plurality of internal SAS drives in the base unit and a plurality of external SAS drives in the target SAS expansion unit, wherein the internal plurality of SAS drives are connected by the base unit to the plurality of external SAS drives for allowing the controller to manage the plurality of internal SAS drives in the base unit and the plurality of external SAS drives such that those of the plurality of external SAS drives designated as standby drives are global between the base unit and the target SAS expansion unit.

15. A method of manufacturing, comprising:
   providing a plurality of just a bunch of disks (JBOD) expansion units;
   providing serial attached SCSI storage (SAS) expanders included in the plurality of JBOD expansion units;
   providing a single SAS port that is attached to the plurality of JBOD expansion units having the SAS expanders;
   providing a single SAS cable to connect the SAS expanders to the SAS port; and
   providing a base unit having the single SAS port, wherein
   the single SAS port is converted into multiple redundant paths by a split of the SAS cable at a location along the SAS cable between the single SAS port of the base unit and SAS expanders of the plurality of JBOD expansion units to provide a plurality of paths to a similar SAS target expander in the plurality of JBOD expansion units through the single SAS port on the base unit.

16. The method of manufacturing of claim 15, wherein the SAS is cable is customized to limit a hardware footprint and to provide load balancing and highly available redundant connectivity between the base unit and each of the SAS expanders.

17. The method of manufacturing of claim 15, further including providing a raid controller on the base unit and at least one processor device controlling the raid controller, wherein the base unit using the single SAS port generates high availability of a SAS architecture using application level firmware between the base unit and each of the SAS expanders in the same one of the plurality of JBOD expansion units while using the single SAS port that is external on the RAID controller.

18. The method of manufacturing of claim 15, further including providing at least one of SAS drives, serial ATA (SATA) drives, and solid state drives (SSD) drives in the plurality of JBOD expansion units, wherein the at least one of the SAS drives, the serial ATA (SATA) drives, and the solid state drives (SSD) drives in the plurality of JBOD expansion units are assigned with two different SAS addresses via the SAS expanders that are redundant of the plurality of JBOD expansion units.

19. The method of manufacturing of claim 17, further including providing a plurality of internal SAS drives in the base unit and a plurality of external SAS drives in at least one of the plurality of JBOD expansion units, wherein the plurality of internal SAS drives are connected by the base unit to the plurality of external SAS drives for allowing the RAID controller to manage the plurality of internal SAS drives in the base unit and the plurality of external SAS drives such that those of the plurality of external SAS drives designated as hot spares are global between the base unit and the at least one of the plurality of JBOD expansion units, wherein the hot spares are standby drives.

20. The method of manufacturing of claim 18, further including providing a 4 lane SAS connection of the single SAS port, wherein the 4 lane SAS connection of the SAS port is split into at least one of two dual lane SAS connections and a single lane SAS connection for connecting at least one of the SAS expanders of the plurality of JBOD expansion units, and the at least one of the two dual lane SAS connections and the single lane SAS connection are used as the plurality of paths to a same set of the at least one of the SAS drives, the serial ATA (SATA) drives, and the solid state drives (SSD) drives where if one of the plurality of paths fails a redundant path of the plurality of paths maintains connectivity.

* * * * *